Patented Aug. 17, 1954

2,686,723

UNITED STATES PATENT OFFICE 2,686,723

STABILIZATION OF EDIBLE MATERIALS

Joseph A. Chenicek, Bensenville, Ill., assignor to Universal Oil Products Company, Chicago, Ill., a corporation of Delaware No Drawing. Application March 26, 1949, Serial No. 83,752

7 Claims. (Cl. 99—163)

This invention relates to the stabilization of edible materials and more particularly to the use of an oxidation inhibitor and a metal deactivator in retarding deterioration of edible materials.

Various edible materials undergo oxidative deterioration and become rancid in storage. Many of these edible materials also contain or become contaminated with metals or metal compounds, herein referred to as metallic constituents, including one or more of copper, iron, nickel, manganese, vanadium, etc. and compounds thereof, which further catalyze the deterioration of the edible material. The present invention is directed to the use of both an oxidation inhibitor and a metal deactivator in retarding rancidity development in edible materials.

The function of the oxidation inhibitor is entirely distinct from the function of the metal deactivator. The oxidation inhibitor will serve to retard rancidity due to oxidative deterioration but will not function to any considerable extent to deactivate the effect of metals. On the other hand, the metal deactivator will serve to deactivate the effect of the metals but will not, in general, serve to retard oxidative deterioration in the absence of metals. In accordance with the present invention both an oxidation inhibitor and a metal deactivator are used. The combination of the oxidation inhibitor and the metal deactivator results in improved stabilization of the edible material.

In one embodiment the present invention relates to a method of stabilizing edible materials which comprises treating the same with an oxidation inhibitor and a metal deactivator.

In another embodiment the present invention relates to an edible material containing both an oxidation inhibitor and a metal deactivator.

In still another embodiment the present invention relates to a novel stabilizing agent comprising an oxidation inhibitor and a metal deactivator.

Any suitable oxidation inhibitor may be employed within the scope of the present invention. The oxidation inhibitor should be non-toxic, readily soluble in edible materials and should not impart undesirable color, taste or odor. Preferably, the oxidation inhibitor should be resistant to high temperatures so that it will retain its inhibitor potency and carry over into the baked or cooked products.

A preferred oxidation inhibitor comprises 2-tert-alkyl-4-alkoxyphenols. These inhibitors possess peculiar properties which render them particularly suitable for use in edible materials. For example, 2-tert-butyl-4-methoxyphenol has been found to be of high potency in retarding the oxidative deterioration of edible materials, has been found to be non-toxic and has been found to be resistant to high temperature heating. In addition, the inhibitor does not impart excessive color, odor or taste to the edible material. It is readily seen that the 2-tert-alkyl-4-alkoxyphenols are particularly suitable as oxidation inhibitors for use in edible materials.

The 2-tert-alkyl-4-alkoxyphenols have the following general structure:

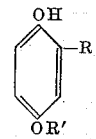

where R is a tert-alkyl group and R' is an alkyl group.

As hereinbefore set forth, the preferred inhibitor comprises 2-tert-butyl-4-methoxyphenol. Other preferred inhibitors include those in which R comprises a tert-alkyl group of from 4 to about 12 carbon atoms and R' comprises an alkyl group of less than about 4 carbon atoms.

Other suitable but not necessarily equivalent oxidation inhibitors include N. D. G. A. (nordihydroguaiaretic acid), tocopherols, gum guaiac, propyl gallate, lauryl thiodipropionate, certain alkyl phenols, certain aminophenols, certain phenylene diamines, certain dihydroxy benzenes, certain dihydroxy naphthalenes, certain hydroxycoumarans, etc. A preferred aminophenol comprises N-n-butyl-p-aminophenol and a preferred phenylene diamine comprises N-N'-di-sec-butyl-p-phenylene diamine. A preferred dihydroxy naphthalene comprises 1,7-dihydroxy naphthalene and a preferred hydroxycoumaran comprises 2,2 - dimethyl-6-tert-butyl-5-hydroxycoumaran.

Any suitable metal deactivator may be employed within the scope of the present invention. The metal deactivator should be non-toxic, readily soluble and should not impart undesirable taste, color or odor to the edible material.

Preferred metal deactivators include those of the following general structure:

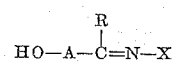

where OH is a hydroxy group, A is an aromatic nucleus to which the groups are attached on adjacent carbon atoms, R is hydrogen or an alkyl group, N is nitrogen, and X is OH, a hydrocarbon group or a substituted hydrocarbon group.

Where X is OH, typical examples of suitable inhibitors include salicylaldoxime, o-hydroxy acetophenone oxime, etc. Where X is a hydrocarbon group, typical examples of suitable compounds include salicylal-butylamine, salicylal-amylamine, salicylal-hexylamine, etc.

By substituted hydrocarbon group in the above formula, I mean a hydrocarbon group having a hydroxy, alkyl, the

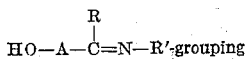

in which R' contains at least 2 carbon atoms in which the 2 nitrogen atoms are attached to different carbon atoms, and/or a hydrocarbon group containing in the chain an element from the group consisting of nitrogen, oxygen and sulfur.

Where the substituted hydrocarbon group contains a hydroxy substituent, typical examples of suitable compounds include 2-(salicylal-o-amino)-phenol, salicylal-ethanolamine, salicylal-propanolamine, salicylal-butanolamine, etc. Where the substituted hydrocarbon group contains an alkoxy substituent, suitable compounds include salicylal-β-ethoxyethylamine, salicylal-β-propoxypropylamine, salicylal-β-butoxybutylamine, etc.

Where the substituted hydrocarbon group comprises the

HO—A—C̶=N—R'-grouping the compounds will have the formula

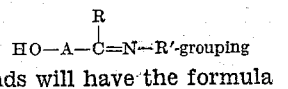

Typical compounds include in this group are 1,2-di-(salicylalamino)-propane, 1,3-di-(salicylalamino)-butane, 1,2-di-(salicylalamino)-pentane, etc.

Where the substituted hydrocarbon group contains nitrogen in the chain, suitable compounds include bis-(β-salicylalamino)-ethylamine, bis-(β-salicylalamino)-propylamine, bis-(β-salicylalamino)-butylamine, bis-(β-salicylalamino)-amylamine, etc. Where the hydrocarbon substituted compound contains oxygen in the chain, suitable compounds include bis-(β-salicylalamino-ethyl ether, bis-(β-salicylalamino)-propyl ether, bis-(β-salicylalamino)-butyl ether, bis-(β-salicylalamino)-amyl ether, etc. Where the hydrocarbon substituted group contains sulfur in the chain, suitable compounds include bis-(β-salicylalamino)-ethyl sulfide, bis-(β-salicylalamino)-propyl sulfide, bis-(β-salicylalamino)-butyl sulfide, bis-(β-salicylalamino)-amyl sulfide, etc.

Other suitable but not necessarily equivalent metal deactivators include the heterocyclic carboxylic acids and particularly those in which the heterocyclic atom is nitrogen. Typical compounds in this class include picolinic acid, 2,4-pyridine-dicarboxylic acid, 8-quinoline carboxylic acid, 2,3-quinoline dicarboxylic acid, 2,4-quinoline dicarboxylic acid, etc.

It is understood that the oxidation inhibitor and metal deactivator also may be used in conjunction with other additives and particularly synergists such as phosphoric acid, citric acid, etc. A synergist is defined as a compound which serves to increase the potency of the inhibitor beyond that expected from the cumulative effects of the inhibitor and of the other compound.

The amount of oxidation inhibitor and metal deactivator to be used will depend upon the particular application. When added to an edible material such as lard, peanut oil, etc., the oxidation inhibitor will generally be employed in an amount of less than 1% by weight and generally within the range of from about 0.001% to about 0.5%. The metal deactivator will generally be employed in an amount of less than about 0.1% by weight and usually within the range of from about 0.0001% to about 0.05% by weight. The synergist will usually be employed in an amount of less than about 0.1% and generally within the range of from about 0.0001% to about 0.05% by weight.

The oxidation inhibitor and metal deactivator may be added separately to the edible material or they may be commingled, with or without a synergist, and then added to the edible material in a single step. When desired, these compounds may be dissolved in a suitable solvent such as propylene glycol. When a water dispersible composition is desired, the oxidation inhibitor and/or metal deactivator may be commingled with a suitable emulsifying agent such as lecithin. Other suitable emulsifying agents include those derived from hexahydric alcohols by esterification or esterification - etherification. Typical emulsifying agents of this group include mannitan monooleate, mannitan monolaurate, sorbitan monooleate, mannitol monooleate, mannide monooleate, sorbitan monopalmitate, polyoxyethylene sorbitan monolaurate, polyoxyethylene sorbitan monooleate, etc. It is understood that any suitable emulsifying agent may be employed. In some cases, a suitable edible oil and particularly vegetable oil may be employed in the inhibitor composition. The preferred method of applying the oxidation inhibitor and metal deactivator will depend upon the particular use for which it is intended.

In one embodiment of the invention the oxidation inhibitor may be utilized for the stabilization of crops to preserve the desired quantities thereof before and after cutting. It has been found that the drying of crops, either in the field or in drying equipment, results in a loss of valuable food accessory factors. For example, alfalfa loses anywhere from 45% to 85% of its carotene value during the drying treatment. Similarly, carotene is found in sweet potatoes and in other yellow pigmented plants. Vitamin $B_1$ (thiamine hydrochloride) is found in various seeds, grains, nuts, legumes, fruits and vegetables, while vitamin $B_2$ (riboflavin) is found in wheat germ and leafy vegetables. Nicotinic acid (niacin) is found in wheat germ and in several green leafy vegetables, while vitamin $B_6$ (pyridoxine) is found in whole grain cereals, crude cane molasses, etc. Vitamin C (ascorbic acid) is found in citrus fruits, tomatoes, green peppers, and various other fresh fruits and vegetables, and vitamin E is found in wheat germ oil, cotton seed oil, free leafy vegetables and various grains. Vitamin $K_1$ is found in alfalfa, spinach, and other green vegetables. Pantothenic acid is found in crude cane molasses and wheat germ. Several postulated vitamins which have not as yet been completely accepted, such as citrin, gizzard erosion factor, etc., are found in various crops, the citrin being present in citrus foods, and the gizzard erosion factor being present in alfalfa, kale, etc. It is understood that the above is merely a brief reference to the vitamin content of various crops and that these and other crops also may contain other vitamins as, for example, spinach contains vitamins A, B₂, later known as vitamin G (riboflavin) and C, beets contain vitamin B₁, potatoes contain vitamin B₂, parsley, cabbage and berries contain vitamin C, etc.

In addition to vitamins or in absence of vitamins, various crops contain other desirable substances which tend to deteriorate due to oxidative deterioration. For example, various fatty acids, such as caprylic, capric, lauric, myristic, palmitic, stearic, oleic, linoleic, etc., are found in the oils of coconut, babassu, palm kernel, olive, castor, peanut, rapeseed, cotton seed, corn, soy bean, etc. Alcohols are found in cockfoot grass, wheat, lucerne leaf, etc. Various sterols are found in plant oils, ergosterol, for example, being found in soya bean oil. Further, crops may become rancid and lose desirable qualities such as taste, odor, retention of physical shape (non-wilting), etc.

The term "crops" as used in the present invention is intended to include any substance grown from the soil to be used as a food for humans or animals, either in the form as gathered from the field or after suitable modification in form, such as by pressing, grinding, pulverizing, slurrying, making into paste, flour, etc., either used as such or after suitable cooking. Thus the present invention is applicable to the treatment of forage crops, such as alfalfa, clover, hay, fodder, etc.; grains such as corn, wheat, oats, rice, barley, rye, soy beans, etc.; vegetables such as carrots, peas, spinach, beets, potatoes, parsley, cabbage, etc.; fruits including berries, oranges, lemons, grapefruit, apples, bananas, melons, dates, figs, etc.; nut crops including peanuts, walnuts, pecans, almonds, chestnuts, hazel nuts, etc.; hops, coffee, tea, sugar crops, etc. Also included are crops such as tobacco, which although not actually consumed as such, are chewed and the oils therefrom are allowed to enter into the system. It is understood that the above crops are merely typical representatives and that the broad scope of the present invention is not intended to be unduly limited to the corps specifically mentioned, but is to include all other crops subject to oxidative deterioration.

Other solid edible materials which may be treated in accordance with the present invention include meat, fish, dairy products such as cheese, dried milk and butter, candy, chocolate, prepared mixes, etc. These materials may be treated with the additives either before or after cooking, baking, smoking or the like.

Other edible oils and fats which may be stabilized in accordance with the present invention include the following as typical representatives: linseed oil, menhaden oil, cod liver oil, castor oil, olive oil, rapeseed oil, coconut oil, palm oil, corn oils, sesame oil, peanut oil, babassu oil, butter, fat, lard, beef tallow, etc., as well as hydrogenated oils and fats. It is understood that other oils and fats may be treated within the scope of the present invention, including oils and fats which previously have been subjected to various treatments, such as blowing with air, heat treatment, etc.

The following examples are introduced for the purpose of further illustrating the novelty and utility of the present invention but not with the intention of unduly limiting the same.

Example I

Lard containing metallic constituents may be stabilized by adding thereto 0.001% by weight of 2-(salicylalamino)-phenol, 0.02% by weight of 2-tert-butyl-4-methoxyphenol and 0.005% by weight of phosphoric acid.

Example II

Alfalfa normally contains metallic constituents and may be stabilized by treating the same with 0.01% of 1,2-di-(salicylalamino)-propane and 0.1% by weight of N-N'-di-sec-butyl-p-phenylene diamine.

I claim as my invention:

1. A method of stabilizing an edible material subject to oxidative deterioration and containing a metallic constituent which catalyzes said deterioration, which comprises adding to said edible material an oxidation inhibitor comprising a 2-tert-alkyl-4-alkoxyphenol and a metal deactivator having the following general structure:

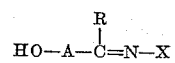

where OH is a hydroxy group, A is an aromatic nucleus to which the adjoining groups are attached on adjacent carbon atoms, R is selected from the group consisting of hydrogen and alkyl, N is nitrogen, and X is selected from the group consisting of OH, a hydrocarbon group and a substituted hydrocarbon group.

2. A method of stabilizing edible fats and oils normally tending to deteriorate in storage and containing a metallic constituent which catalyzes said deterioration, which comprises incorporating therein from about 0.001% to about 0.5% by weight of a 2-tert-alkyl-4-alkoxyphenol and from about 0.0001% to about 0.5% by weight of a metal deactivator having the following general structure:

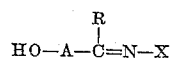

where OH is a hydroxy group, A is an aromatic nucleus to which the adjoining groups are attached on adjacent carbon atoms, R is selected from the group consisting of hydrogen and alkyl, N is nitrogen, and X is selected from the group consisting of OH, a hydrocarbon group and a substituted hydrocarbon group.

3. A method of stabilizing lard normally tending to deteriorate in storage and containing a metallic constituent which catalyzes said deterioration, which comprises incorporating therein from about 0.001% to about 0.5% by weight of 2-tert-butyl-4-methoxyphenol and from about 0.0001% to about 0.05% by weight of 2-(salicylalamino)-phenol.

4. An edible material subject to oxidative deterioration containing a metallic constituent which catalyzes said deterioration and further containing a 2-tert-alkyl-4-alkoxy-phenol and a metal deactivator having the following general structure:

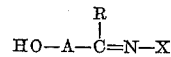

where OH is a hydroxy group, A is an aromatic nucleus to which the adjoining groups are attached on adjacent carbon atoms, R is selected from the group consisting of hydrogen and alkyl, N is nitrogen, and X is selected from the group consisting of OH, a hydrocarbon group and a substituted hydrocarbon group.

5. Edible fats and oils normally tending to deteriorate in storage and containing a metallic constituent which catalyzes said deterioration and further containing from about 0.001% to about 0.5% by weight of a 2-tert-alkyl-4-alkoxyphenol and from about 0.0001% to about 0.05% by weight of a metal deactivator having the following general structure:

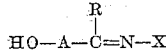

where OH is a hydroxy group, A is an aromatic nucleus to which the adjoining groups are attached on adjacent carbon atoms, R is selected from the group consisting of hydrogen and alkyl, N is nitrogen, and X is selected from the group consisting of OH, a hydrocarbon group and a substituted hydrocarbon group.

6. Lard normally tending to deteriorate in storage and containing a metallic constituent which catalyzes said deterioration and further containing from about 0.001% to about 0.5% by weight of 2-tert-butyl-4-methoxyphenol and from about 0.001% to about 0.05% by weight of 2-(salicylalamino)-phenol.

7. A method of stabilizing lard subject to oxidative deterioration and containing a metallic constituent which catalyzes said deterioration, which comprises adding to said lard an oxidation inhibitor comprising a 2-tert-alkyl-4-alkoxyphenol and a metal deactivator having the following structure:

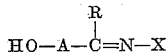

where OH is a hydroxy group, A is an aromatic nucleus to which the adjoining groups are attached on adjacent carbon atoms, R is selected from the group consisting of hydrogen and alkyl, N is nitrogen, and X is selected from the group consisting of OH, a hydrocarbon group and a substituted hydrocarbon group.

References Cited in the file of this patent

UNITED STATES PATENTS

| Number | Name | Date |
|---|---|---|
| 2,181,121 | Downing | Nov. 28, 1939 |
| 2,310,710 | Rosenwald et al. | Feb. 9, 1943 |
| 2,400,876 | Daskais | May 28, 1946 |